(12) United States Patent
Fujita et al.

(10) Patent No.: US 6,225,249 B1
(45) Date of Patent: May 1, 2001

(54) ALUMINUM NITRIDE SINTERED BODY, METHOD OF PRODUCING THEREOF, ELECTROSTATIC CHUCK, SUSCEPTOR, DUMMY WAFER, CLAMP RING AND PARTICLE CATCHER USING THE SAME

(75) Inventors: Mitsuhiro Fujita, Kanagawa; Shinichiro Aonuma; Kouji Sano, both of Tokyo; Shigeko Muramatsu, Shizuoka, all of (JP)

(73) Assignee: Toshiba Ceramics Co., Ltd., Tokyo (JP)

( * ) Notice: Subject to any disclaimer, the term of this patent is extended or adjusted under 35 U.S.C. 154(b) by 0 days.

(21) Appl. No.: 09/349,710

(22) Filed: Jul. 8, 1999

(30) Foreign Application Priority Data

Jul. 8, 1998 (JP) ................................... 10-208685
Mar. 30, 1999 (JP) ................................... 11-089720

(51) Int. Cl.$^7$ ................................... C04B 35/581
(52) U.S. Cl. ........................................ 501/98.4; 264/653
(58) Field of Search ..................... 501/98.4; 264/653

(56) References Cited

U.S. PATENT DOCUMENTS

| | | | |
|---|---|---|---|
| 5,063,183 | | 11/1991 | Taniguchi et al. ...................... 501/96 |
| 5,314,850 | * | 5/1994 | Miyahara ............................ 501/98.4 |
| 5,500,395 | * | 3/1996 | Ueno et al. .......................... 501/98.4 |
| 5,744,411 | * | 4/1998 | Zhao et al. .......................... 501/98.4 |
| 5,767,027 | * | 6/1998 | Sakon et al. ......................... 501/98.4 |
| 5,773,377 | * | 6/1998 | Harris et al. ........................ 501/98.4 |
| 5,874,378 | * | 2/1999 | Ishida et al. ........................ 501/98.4 |
| 5,958,813 | * | 9/1999 | Aida et al. .......................... 501/98.4 |
| 5,993,699 | * | 11/1999 | Katsuda et al. ...................... 501/98.4 |
| 6,001,760 | * | 12/1999 | Katsuda et al. ...................... 501/98.4 |

FOREIGN PATENT DOCUMENTS

| | | |
|---|---|---|
| 62-171964 | 7/1987 | (JP) . |
| 406191953 * | 7/1994 | (JP) . |
| 8-51001 | 2/1996 | (JP) . |
| 8-78202 | 3/1996 | (JP) . |
| 8-153603 | 6/1996 | (JP) . |
| 8-157263 | 6/1996 | (JP) . |

\* cited by examiner

*Primary Examiner*—Karl Group
(74) *Attorney, Agent, or Firm*—Foley & Lardner

(57) ABSTRACT

The aluminum nitride sintered body of the invention has a thermal conductivity equivalent to that of a high purity aluminum nitride sintered body and a volume resistivity of $10^{14}$ Ω·cm or less, and is composed of aluminum nitride phase and yttrium aluminum oxide phase formed at grain boundaries of aluminum nitride phase, where the yttrium aluminum oxide phase is 0.5 to 10 wt % in extremes for aluminum nitride phase, and contains at least one kind of lanthanide element 0.1 to 20 atom % in extremes for yttrium element.

20 Claims, 1 Drawing Sheet

ALUMINUM NITRIDE SINTERED BODY, METHOD OF PRODUCING THEREOF, ELECTROSTATIC CHUCK, SUSCEPTOR, DUMMY WAFER, CLAMP RING AND PARTICLE CATCHER USING THE SAME

BACKGROUND OF THE INVENTION

1. Field of the Invention

The present invention relates to an aluminum nitride sintered body, a method of producing thereof, electrostatic chuck, susceptor, dummy wafer, clamp ring and particle catcher using the same.

2. Background of the Invention

Since aluminum nitride has excellent thermal conductivity and electric insulating property, sintered bodies thereof have been employed as materials for multilayer interconnection substrates.

But, aluminum nitride has recently been appraised in plasma resistibility; application of aluminum nitride has been advanced for relative products of semiconductor producing apparatus of electrostatic chuck, susceptor or dummy wafer.

Description of the Related Art

Conventionally known is such aluminum nitride sintered body of high thermal conductivity (100 W/mK) which is composed of aluminum nitride (AlN) phase and yttrium aluminum oxide phase of mainly YAG ($3Y_2O_3 \cdot 5Al_2O_3$ or $Y_3Al_5O_{12}$), where yttrium aluminum oxide phase catching impure oxygen is formed at grain boundary of aluminum nitride (see JP-A-62-171964).

This aluminum nitride sintered body is produced by granulating a mixture of aluminum nitride powder and yttrium oxide ($Y_2O_3$) powder, forming, dewaxing, and then sintering the dewaxed body in non oxidizing atmosphere. Yttrium oxide and aluminum-oxygen element contained in crystal of aluminum nitride are reacted during sintering to cause to generate yttrium aluminum oxide in liquid phase, so that oxygen element in crystal of aluminum nitride is trapped in grain boundary, and oxygen content in crystal of aluminum nitride is controlled to be very low level so as to make an aluminum nitride sintered body of high thermal conductivity and high insulating property.

However, in the conventional aluminum nitride sintered body, electric resistance is too high as around $10^{15} \Omega \cdot cm$ in volume resistivity at room temperature (20° C.±2° C.) or higher than it, and therefore when applying it to electrostatic chuck, susceptor, clamp ring, dummy wafer or particle catcher, the following inconvenience will arise. For example, in the electrostatic chuck, inconveniences are shortage of holding force by high resistance of a dielectric layer, and remaining holding force when dichucking (when stopping impression of voltage). In the dummy wafer, inconvenience is failure of holding at the electrostatic chuck. In the susceptor and clamp ring, it is a disorder of a wafer assumed to be due to static electricity. In the particle catcher, it is shortage in capture force of particles by high resistance of the dielectric layer.

Desirous electric resistance value of aluminum nitride sintered body in these applications is assumed to be around $10^{10}$ to $10^{14} \Omega \cdot cm$ as the volume resistivity of room temperature. For removing these inconveniences, there are attempts to reduce the volume resistivity of an aluminum nitride crystal formed by a chemical vapor deposition method by making elements of IIb, IVb and VIb or oxygen solute in the aluminum nitride crystal (see JP-A-8-153603, JP-A-8-78202, JP-A-8-157263 and JP-A-8-51001).

However, since these arts introduce defects or strains into the aluminum nitride crystal, it is considered that they bring about lowering of thermal conductivity resulting in phonon scattering, and predominance of the high thermal conductivity of aluminum nitride is difficult to keep. Further, the chemical vapor deposition method is a suitable instrument for producing film like products, but has a defect not practical for producing bulk like products.

SUMMARY OF THE INVENTION

Thus, it is an object of the invention to provide an aluminum nitride sintered body having a thermal conductivity (100 W/mK or more) equivalent to high purity aluminum nitride and a volume resistivity at room temperature of $10^{14} \Omega \cdot cm$ or less, and a production method therefor as well as an electrostatic chuck, susceptor, dummy wafer, clamp ring and particle catcher using the same.

For solving the problems involved with the related prior art, according to the invention, an aluminum nitride sintered body composed of an aluminum nitride phase and an yttrium aluminum oxide phase formed at grain boundary of an aluminum nitride phase, is characterized in that the yttrium aluminum oxide phase is 0.5 to 10 wt % in extremes for the aluminum nitride phase, and contains at least one kind of lanthanoid element 0.1 to 20 atom % in extremes for an yttrium element.

On the other hand, a method of producing the aluminum nitride sintered body is characterized in that an aluminum nitride powder is added with an yttrium compound powder and at least one kind of lanthanide compound powder so as to form mixed powders, and the mixture is dewaxed, and subsequently the dewaxed body is sintered at temperature between 1600 and 2000° C. in a non oxidizing atmosphere, thereby to produce an aluminum nitride sintered body where the yttrium aluminum oxide phase is 0.5 to 10 wt % in extremes for the aluminum nitride phase, and contains at least one kind of lanthanide element 0.1 to 20 atom % in extremes for the yttrium element.

With respect to the mixed powder, it is preferable that the aluminum nitride powder is added with yttrium compound powder in such a manner that the yttrium aluminum oxide phase to be generated by sintering is 0.5 to 10 wt % in extremes for the aluminum nitride phase, and contains at least one kind of lanthanide element 0.1 to 20 atom % in extremes for yttrium element.

In addition, it is characterized that the electrostatic chuck, susceptor, dummy wafer, clamp ring and particle catcher use the aluminum nitride sintered body, respectively.

DETAILED DESCRIPTION OF THE INVENTION

Figure 1:
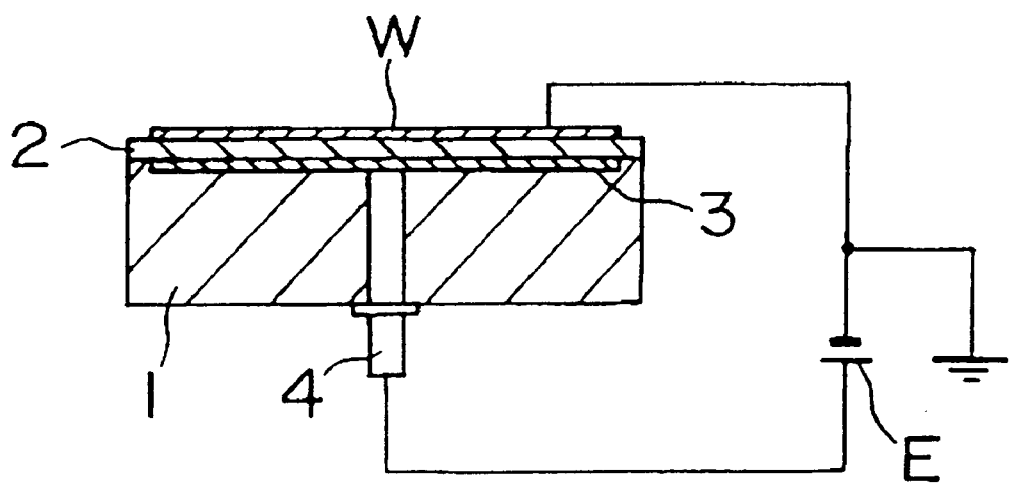
FIG. 1 is a cross sectional view showing one example of a practiced embodiment of the electrostatic chuck of the invention.

Since any heterogeneous element is not introduced in the aluminum nitride crystal, the inventive aluminum nitride sintered body has the high thermal conductivity as well as since the yttrium aluminum oxide phase contains lanthanoid ion, whereby a strain is imported into an yttrium aluminum oxide crystal lattice, restraint of electric charge carrier is weakened in grain boundary of the aluminum nitride phase (that is, the yttrium aluminum oxide phase), resulting in lowering of the volume resistivity of the aluminum nitride sintered body.

Grain size of aluminum nitride crystal is not specially limited but preferably 3 to 10 μm.

The yttrium aluminum oxide phase contains, other than YAG having a garnet type structure as a main, YAM of monoclinic system ($2Y_2O_3.Al_2O_3$ or $Y_4Al_2O_3$) and YAP ($Y_2O_3.Al_2O_3$ or $YAlO_3$) having a perovskite type structure.

When the yttrium aluminum oxide phase is less than 0.5 wt % in extremes for the aluminum nitride phase, since the yttrium aluminum oxide phase generating the electric charge carrier lacks in quantity, the lowering effect of volume resistivity is not sufficient. In contrast, when the yttrium aluminum oxide phase exceeds 10 wt % in extremes for the aluminum nitride phase, it forms a 3-dimensional network in the aluminum nitride sintered body, and arrests conductivity of phonon, thereby to lower the thermal conductivity.

A preferable proportion of the yttrium aluminum oxide phase for the aluminum nitride phase is 0.7 to 5 wt % in extremes, more preferably 0.7 to 3 wt %. According to setting the proportion of the yttrium aluminum oxide phase for the aluminum nitride phase to 0.7 to 5 wt % in extremes, the lowering effect of volume resistivity gets sufficient and thermal conductivity is hightened. According to setting the upper limit 5 wt %, thermal conductivity can be got to more than 120 W/mK. Further according to setting the proportion of the yttrium aluminum oxide phase for the aluminum nitride phase to 0.7 to 3 wt % in extremes, the lowering effect of volume resistivity gets more sufficient and thermal conductivity is further hightened.

When a content of at least one kind of lanthanoid element in the yttrium aluminum oxide phase is less than 0.1 atom % in extremes for the yttrium element, the lowering effect of volume resistivity is not sufficient. On the other hand, the lanthanoid element to be contained exists mainly in solid solution in the yttrium aluminum oxide crystal and contributes to lowering of the volume resistivity, but when it exceeds 5 atom %, a part of lanthanoid element is not made solute in the yttrium aluminum oxide crystal but reacts with aluminum-oxygen during sintering and generates the lanthanoid aluminum oxide and contributes to heightening of thermal conductivity. However, when the content of lanthanoid element is more than 20 atom % in extremes for the yttrium element, such content of lanthanoid element increases which cannot be made solute in the yttrium aluminum oxide crystal or cannot exist in a form of lanthanoid aluminum oxide, and it not only scarcely contribute to the lowering of volume resistivity but also invites the lowering of thermal conductivity.

A preferable content of at least one kind of lanthanoid element in the yttrium aluminum oxide phase is 0.1 to 15 atom % in extremes for yttrium element, more preferably 0.5 to 10 atom %.

Lanthanoid elements may be any of atomic No.57 to 71 of lanthanum (La), cerium (Ce), praseodymium (Pr), neodymium (Nd), prometium (Pm), samarium (Sm), europium (Eu), gadolinium (Gd), terbium (Tb), dysprosium (Dy), holmium (Ho), erbium (Er), thulium (Tm), ytterbium (Yb) and lutecium (Lu), and Ho, La, Nd and Eu are preferable.

The aluminum nitride sintered body may contain small amou of chromium (Cr) or manganese (Mn) without objection. Since their contents are varied depending upon kinds thereof or kinds of used lanthanoid elements or contests, though not say wholly, the contents may be determined to be around 0.05 to 5 atom % in extremes for yttrium element of the yttrium aluminum oxide phase.

Since Si contained in the aluminum nitride sintered body as an impurity serves as a factor lowering the thermal conductivity, a content of Si in the aluminum nitride sintered body is preferably less than 1 wt %, and more preferably 0.1 wt % or less.

In the method of producing the aluminum nitride sintered body, general yttrium compound powder excepting YAG powder to be added to aluminum nitride powder reacts with aluminum-oxygen substance much existing on surfaces of aluminum nitride particle during sintering, and generates the yttrium aluminum oxide being a liquid phase content, thereby to contribute to making minuteness by a liquid phase sintering of aluminum nitride and removal of oxygen element from aluminum nitride crystal. When YAG powder is selected as yttrium compound powder, since YAG itself becomes a liquid phase during sintering, it does not have ability to remove oxygen element from the aluminum nitride crystal but makes powder of aluminum nitride raw material high pure and restricts exposure of aluminum nitride to an oxidizing atmosphere at a minimum, thereby enabling to control the lowering of the thermal conductivity. When YAG powder is selected, since no reaction with aluminum-oxygen element occurs, there are advantages that non-uniformity of the yttrium aluminum oxide phase caused by non-uniform progress of the reaction with aluminum-oxygen is difficult to occur, and color irregularity sparingly appears in a sintered body to be produced. Further, by combining YAG powder and lanthanoid compound powder, not only the volume resistivity is lowered, but also the lanthanoid compound reacts with aluminum-oxygen element during sintering, and by generating the lanthanoid aluminum oxide, it is possible to capture oxygen element in lanthanoid compound and heighten the thermal conductivity.

On the other hand, the lanthanoid compound powder forms solid solution in a form that the lanthanoid substitutes an yttrium ion of yttrium aluminum oxide and thus contributes to the lowering of the volume resistibity of the aluminum nitride sintered body.

As yttrium compounds, yttrium oxide ($Y_2O_3$), yttrium fluoride ($YF_3$) or yttrium aluminum oxide may be enumerated, but in view of high stability, it is preferable to use yttrium oxide or yttrium aluminum oxide.

As lanthanoid compounds, compounds of all lanthanoid elements may be used and not especially limited, but compounds of La, Nd, Eu or Ho are preferable, and oxides are preferable in view of stability as lanthanoid compounds.

Depending on each element of lanthanoids, available lowering effects of the volume resistivity are different, and therefore, meeting a desired volume resistivity, it is preferable to select one or several kinds of lanthanoid compounds.

For example, in case of using La, the volume resistivity at room temperature may be lowered to $10^{11}$ to $10^{13}$ Ω·cm, in case of using Nd, the volume resistivity at room temperature may be lowered to $10^9$ to $10^{11}$ Ω·cm, in case of Eu, the same may be to $10^{11}$ to $10^{14}$ Ω·cm, and in case of Ho, it may be to $10^{10}$ to $10^{12}$ Ω·cm.

For producing the aluminum nitride sintered body, a mixed powder where the aluminum nitride powder is added with the yttrium compound powder and at least one kind of lanthanoid compound powder, is formed and dewaxed, and subsequently the dewaxed body is sintered at temperature between 1600 and 2000° C. in a non oxidizing atmosphere, thereby to produce an aluminum nitride sintered body where a yttrium aluminum oxide phase is 0.5 to 10 wt % in extremes for aluminum nitride phase, and contains at least one kind of lanthanide element 0.1 to 20 atom % in extremes for yttrium element.

Preferably, such an aluminum nitride sintered body is employed, where the aluminum nitride powder is added with the yttrium compound powder such that the yttrium aluminum oxide phase to be generated by sintering is 0.5 to 10 wt % in extremes for aluminum nitride phase, and at least one kind of lanthanide compound powder is added and prepared such that the lanthanoid element is 0.1 to 20 atom % in extremes for the yttrium element in the yttrium compound powder.

When the yttrium aluminum oxide phase is less than 0.5 wt % in extremes for the aluminum nitride phase, since the yttrium aluminum oxide phase generating electric charge carrier lacks in quantity, the lowering effect of volume resistivity is not sufficient. In contrast, when the yttrium aluminum oxide phase exceeds 10 wt % in extremes for the aluminum nitride phase, it forms a 3-dimensional network in the aluminum nitride sintered body, and arrests conductivity of phonon, thereby to lower the thermal conductivity.

In the method of producing the aluminum nitride sintered body, when yttrium compound powder is added to aluminum nitride powder such that yttrium aluminum oxide phase to be generated by sintering almost falls within the range (0.5 to 10 wt % in extremes) for aluminum nitride phase, it is possible to produce the aluminum nitride sintered body of the yttrium oxide phase being within the range by scarcely volatilizing but surviving the yttrium aluminum phase generated at sintering. Reversely, in case of adding the yttrium compound powder to the aluminum nitride powder to an extent that yttrium aluminum oxide phase to be generated by sintering exceeds the range for aluminum nitride phase, it is possible to produce the aluminum nitride sintered body of the yttrium oxide phase being within the range by volatilizing the yttrium aluminum oxide phase generated at sintering so as to remove a surplus yttrium aluminum oxide phase.

Preferably, the yttrium compound powder is added to the aluminum nitride powder such that yttrium aluminum oxide phase to be generated by sintering falls within the range of 0.5 to 10 wt % in extremes for aluminum nitride phase.

With respect to the adding amount of the yttrium compound powder to the aluminum nitride powder, in case that yttrium aluminum oxide phase to be generated by sintering is less than 0.5 wt % in extremes for the aluminum nitride phase, yttrium aluminum oxide required for sintering aluminum nitride is not enough generated, and since the sintering does not go on sufficiently, dence aluminum nitride sintered body is difficult to be obtained. On the other hand, in case that it exceeds 10 wt % in extremes, yttrium aluminum oxide is much generated, so that deformation is caused at sintering, or a sintering for a long period of time is necessary for volatilizing to remove a surplus yttrium aluminum oxide phase. When using general yttrium compound powders excepting YAG powder, in case that excessive yttrium compound powder is added to aluminum-oxygen element contained in the aluminum nitride compound powder, yttrium compound remaining in the aluminum nitride sintered body is increased, not generating the yttrium aluminum phase, and such an addition invites the lowering of the thermal conductivity of an aluminum nitride sintered body to be produced. With respect to a preferable adding amount of the yttrium compound powder to the aluminum nitride powder, the yttrium aluminum oxide phase to be generated by sintering is 0.7 to 5 wt %, more preferably 0.7 to 3 wt % in extremes for the aluminum nitride phase.

In case that a content of at least one kind of lanthanide element in the yttrium aluminum oxide phase is less than 0.1 atom % in extremes for the yttrium element, the lowering effect of volume resistivity is not sufficient. On the other hand, the contained lanthanoid element mainly exists in a solute form in the yttrium aluminum oxide crystal and contributes to the lowering of volume resistivity, but in case that the content of lanthanoid element is much as more than 5 atom %, a part of lanthanoid element is not made solute in the yttrium aluminum oxide crystal but reacts with aluminum-oxygen during sintering and generates lanthanoid aluminum oxide and contributes to heightening of thermal conductivity. However, when the content of lanthanide element is more than 20 atom % in extremes for yttrium element, such content of lanthanoid element increases, which cannot be made solute in yttrium aluminum oxide crystal or cannot exist in a form of lanthanoid aluminum oxide, and it not only scarcely contribute to the lowering of volume resistivity but also invites the lowering of the thermal conductivity.

In the method of producing the aluminum nitride sintered body, in case that at least one kind of lanthanide element is added such that the lanthanoid element is 0.1 to 20 atom % in extremes for the yttrium element in the added yttrium compound powder, it is possible to produce an AlN sintered body containing at least one kind of lanthanoid element 0.1 to 20 atom % in extremes for the yttrium element.

When the yttrium compound powder is added to the aluminum nitride powder such that the yttrium aluminum oxide phase to be generated by sintering almost falls within the range (0.5 to 10 wt % in extremes) for aluminum nitride phase, since the lanthanoid element remains almost as the added amount, it is possible to maintain, in an AlN sintered body to be produced, the amount of the lanthanoid element for the yttrium element in the mixed powder.

Reversely, in case of adding the yttrium compound powder to aluminum nitride powder to an extent that yttrium aluminum oxide phase to be generated by sintering exceeds the range for aluminum nitride phase, the yttrium aluminum oxide phase generated at sintering is volatilized to remove a surplus yttrium aluminum oxide phase, but in this case since the lanthanoid element is also volatilized, it is possible to maintain, in an AlN sintered body to be produced, the amount of the lanthanoid element for the yttrium element in the mixed powder.

A preferable adding amount of the lanthanide compound powder is 0.1 to 15 atom %, more preferably 0.5 to 10 atom % in extremes for the yttrium element in the yttrium compound powder.

Subsequently, this mixed powder is added with solvent and binder and mixed to turn out slurry, followed by granulating forming and then dewaxing. A dewaxing atmosphere is not specially limited, and it may be an air and a non-oxidizing atmosphere. When using YAG powder, since it does not have removing ability of oxygen element at sintering, it is desirous to carry out the dewaxing in the non-oxidizing atmosphere for controlling the lowering of the thermal conductivity.

The sintering of the dewaxed body must be performed during reducing pressure or under the non-oxidizing atmosphere of inert gas atmosphere such as Ar or $N_2$. A sintering under an oxidizing atmosphere brings about oxidation of aluminum nitride, and an aluminum nitride sintered body of high thermal conductivity cannot be obtained.

In case that a sintering temperature of the dewaxed body is less than 1600° C., the yttrium aluminum oxide indispensable for making the aluminum nitride dense is not generated as a liquid phase element, and a dense sintered body cannot be produced. On the other hand, when it exceeds 2000° C., the yttrium aluminum oxide much volatilizes and it is difficult to secure the yttrium aluminum oxide of a necessary amount for lowering the volume resistivity. Further, the sintering at such high temperature easily causes over-sintering and makes cost high without finding any merit.

A preferable sintering temperature of the dewaxed body is 1750 to 1900° C.

In order to obtain the mixed powder, it is sufficient to premix the yttrium compound powder and the lanthanoid compound powder, heat it at temperature of 1400 to 1800° C.(heat-treatment) and mix with the aluminum nitride powder. According to the heat-treatment, an AlN sintered body in which the lanthanoid element is solute uniformly, can be obtained easily. Therefore distribution of the volume resistivity of the sintered body gets uniform. Therefore the volume resistivity of the sintered body in each lot gets uniform.

In the electrostatic chuck, susceptor, dummy wafer, clamp ring and particle catcher using the inventive aluminum nitride sintered body, since the aluminum nitride sintered body has the volume resistivity at room temperature of $10^{14} \Omega \cdot cm$ or less, in the electrostatic chuck, holding force is improved and remaining holding force is decreased. In the susceptor and clamp ring, static electricity is can be escaped and wafer may be held statically. In the dummy wafer, the holding at the electrostatic chuck is possible. In the particle catcher, the particle capturing force is heightened.

In addition, since the aluminum nitride sintered body has the high thermal conductivity (100 W/mK or more), rapid increasing and decreasing of temperature are possible in all of the usage thereof, and throughput of processing the wafer may be improved. In the electrostatic chuck, susceptor and clamp ring for holding the wafer, in-plane temperature of the wafer can be kept uniform.

Desired volume resistivity at room temperature is varied in dependence upon usage or serving temperature, and so the volume resistivity is adjusted by appropriately selecting lanthanoid elements. Ordinarily, the serving temperatures of the susceptor, clamp ring and dummy wafer are more than minus number 10° C., and the serving temperatures of the electrostatic chuck and the particle catcher are around minus forty or fifty ° C. to 400° C.

In the electrostatic chuck and particle catcher, it is sufficient to use the volume resistivity at room temperature $10^{14} \Omega \cdot cm$ or less and the aluminum nitride sintered body having the high thermal conductivity to a dielectric layer, and it is possible to use such a substrate, for example, alumina ($Al_2O_3$) silicon nitride ($Si_3N_4$) and ceramics of the aluminum nitride having the volume resistivity at room temperature of $10^{14}$ $\Omega \cdot cm$ or more. Ordinarily, the aluminum nitride is employed.

DESCRIPTION OF THE PREFERRED EXAMPLES

Explanation will be made to embodiments of reducing the invention to practice, referring to Examples and Comparative Examples.

Examples 1 to 40

At first, the yttrium compounds and the lanthanoid compounds shown in Tables 1 and 2 were mixed such that the contents of the lanthanoid elements to the yttrium elements are proportions as shown in Tables 1 and 2, ion exchanging water of a proper quantity was added thereto and mixed for 18 hours to turn out a slurry by using a ball mill with alumina ball as a grinding media, the slurry was dried by an evaporator, ground in an alumina mortar, then introduced into a high purity alumina crucible, heated at 1600° C. for 2 hours in an atmospheric air, and thus yttrium compounds containing various kinds of lanthanoid elements were obtained.

Next, a high purity aluminum nitride powder (produced by Mitsui Chemicals Ltd. MAN-2) was added with the heat-treated yttrium compound containing lanthanoid elements such that the proportions of the yttrium aluminum oxide phase to be generated by sintering to the aluminum nitride are as shown in Tables 1 and 2, methanol of a proper quantity was added thereto, ground and mixed for 18 hours to turn out a slurry by using the ball mill with aluminum nitride ball as a grinding media, methanol solution of polyvinylbutyral as a binder was prepared such that the amount of polyvinylbutyral was 3 wt % in extremes for the aluminum nitride powder, and then it was further mixed for 2 hours in the ball mill to fully mix the binder to turn out a slurry, and thus various kinds of slurries were obtained.

Subsequently, each slurry was dried by a spray drier, granulated, formed with a single axial metal mold under pressure of 3 MPa, pressed under cold isostatic pressure of 100 MPa to produce various kinds of formed bodies, and each of the formed bodies was dewaxed at a maximum temperature of 600° C. in a nitrogen gas flow when adding YAG, and in the atmospheric air when adding the yttrium oxide, and each of obtained dewaxed bodies was sintered at a maximum temperature of 1900° C. in the nitrogen gas atmosphere, and various kinds of aluminum nitride sintered bodies shown in Tables 1 and 2 were produced by scarcely volatilizing the yttrium aluminum oxide phase generated at sintering but surviving generating amounts as they were.

Grain diameters of the aluminum nitride sintered bodies were 3 to 10 $\mu$m.

The amount of Si containing in the aluminum nitride sintered bodies were 190 ppm or less.

Comparative Examples 1 to 10

The aluminum nitride sintered bodies of the Comparative Examples 1 to 8 were obtained as in the same process as Examples 1 to 40 other than that raw material powders were mixed at proportions as shown in Table 3, while those of the Comparative Examples 9 and 10 were obtained through the following process.

At first, a high purity aluminum nitride powder (produced by Mitsui Chemicals Ltd. MAN-2) was added with the yttrium compounds at proportions as shown in Table 3, methanol of a proper quantity was added thereto, ground and mixed for 18 hours to turn out a slurry by using the ball mill with aluminum nitride ball as a grinding media, methanol solution of polyvinylbutyral as a binder was prepared such that the amount of polyvinylbutyral was 3 wt % in extremes for the aluminum nitride powder, and then it was further mixed for 2 hours in the ball mill to fully mix the binder to turn out a slurry, and thus various kinds of slurries were obtained.

Subsequently, similarly to Examples, each slurry was dried by a spray drier, granulated, formed with the single axial metal mold under pressure of 30 MPa, pressed under cold isostatic pressure of 100 MPa to produce various kinds of formed bodies, and each of the formed bodies was dewaxed at a maximum temperature of 600° C. in a nitrogen gas flow when adding YAG and in the atmospheric air when adding the yttrium oxide, and each of obtained dewaxed bodies was sintered at a maximum temperature of 1900° C. in the nitrogen gas atmosphere.

Grain diameters of the aluminum nitride sintered bodies were 3 to 10 μm.

The amount of Si containing in the aluminum nitride sintered bodies were 190 ppm or less.

When the composition elements of the aluminum nitride sintered bodies of the Examples and the Comparative Examples were identified by a powder X-rays diffraction, the yttrium compounds were changed to YAG in all samples. When the yttrium elements were investigated EPMA (electron micro probe analysis), the yttrium elements were all recognized to be unevenly distributed at grain boundaries in the aluminum nitride sintered bodies.

From these results, the amounts of the yttrium elements in the aluminum nitride sintered bodies were determined by ICP (induction coupling plasma) emission spectra analysis and the amount of the yttrium aluminum oxide in these aluminum nitride were calculated, it was 1.7 to 1.9 wt % in extremes for aluminum nitride excepting the Comparative Examples 1 to 4. Those of the Comparative Examples 1 and 2 were 0.4 wt %, and those of the Comparative Examples 3 and 4 were 11.2 to 11.4 wt %.

Further, when the lanthanoid elements were investigated by EPMA, those were unevenly distributed at grain boundaries in the aluminum nitride sintered bodies. When the amounts of the lanthanoid element in the yttrium aluminum oxide phase were calculated from the lanthanoid amount determined by ICP emission spectra analysis, they were 0.1 to 19.3 atom % in extremes for the yttrium element excepting the Comparative Examples 5 to 8. Those of the Comparative Examples 5 and 6 were 0.08 to 0.09 atom %, and those of the Comparative Examples 7 and 8 were 20.9 to 21.0 atom %.

With respect to the samples of the aluminum nitride sintered bodies of the Examples and the Comparative Examples, when the volume resistivity at room temperature (20° C.±2° C.) was measured following JIS-C2141 and the thermal conductivity was measured by a laser flash type thermal conductivity measuring machine, results were as shown in Tables 1 to 3.

TABLE 1

|  | A | B | $C_{1)}$ | $D_{2)}$ | E | F |
|---|---|---|---|---|---|---|
| Example 1 | YAG | $Nd_2O_3$ | 1.9 | 0.1 | $8 \times 10^{10}$ | 116 |
| Example 2 |  |  | 1.9 | 0.5 | $4 \times 10^{10}$ | 118 |
| Example 3 |  |  | 1.8 | 4.9 | $3 \times 10^{10}$ | 133 |
| Example 4 |  |  | 1.8 | 14.4 | $2 \times 10^{10}$ | 135 |
| Example 5 |  |  | 1.8 | 19.1 | $2 \times 10^{10}$ | 121 |
| Example 6 |  | $Eu_2O_3$ | 1.9 | 0.1 | $6 \times 10^{13}$ | 113 |
| Example 7 |  |  | 1.9 | 0.5 | $4 \times 10^{12}$ | 117 |
| Example 8 |  |  | 1.9 | 4.9 | $2 \times 10^{13}$ | 131 |
| Example 9 |  |  | 1.8 | 14.5 | $1 \times 10^{13}$ | 134 |
| Example 10 |  |  | 1.8 | 19.3 | $1 \times 10^{12}$ | 119 |
| Example 11 |  | $HO_2O_3$ | 1.9 | 0.1 | $7 \times 10^{12}$ | 119 |
| Example 12 |  |  | 1.9 | 0.5 | $5 \times 10^{12}$ | 122 |
| Example 13 |  |  | 1.9 | 4.8 | $1 \times 10^{12}$ | 133 |
| Example 14 |  |  | 1.8 | 14.3 | $9 \times 10^{11}$ | 135 |
| Example 15 |  |  | 1.8 | 19.2 | $8 \times 10^{11}$ | 121 |
| Example 16 |  | $La_2O_3$ | 1.9 | 0.1 | $3 \times 10^{13}$ | 121 |
| Example 17 |  |  | 1.9 | 0.5 | $1 \times 10^{12}$ | 128 |
| Example 18 |  |  | 1.9 | 4.8 | $7 \times 10^{12}$ | 132 |

TABLE 1-continued

|  | A | B | $C_{1)}$ | $D_{2)}$ | E | F |
|---|---|---|---|---|---|---|
| Example 19 |  |  | 1.9 | 14.5 | $4 \times 10^{12}$ | 137 |
| Example 20 |  |  | 1.8 | 19.2 | $9 \times 10^{11}$ | 126 |

Note
A: Yttrium compound;
B: Lanthanide compound;
C: Yttrium aluminum oxide amount (wt %);
D: Lanthanoid amount (atom %);
E: Volume resistivity at room temperature (Ωcm)
F: Thermal conductivity (w/mk)
1) Extremes of amount of yttrium aluminum oxide for aluminum nitride
2) Extremes of amount of lanthanoid element for yttrium element

TABLE 2

|  | A | B | $C_{1)}$ | $D_{2)}$ | E | F |
|---|---|---|---|---|---|---|
| Example 21 | $Y_2O_3$ | $Nd_2O_3$ | 1.8 | 0.1 | $1 \times 10^{11}$ | 122 |
| Example 22 |  |  | 1.8 | 0.5 | $7 \times 10^{10}$ | 128 |
| Example 23 |  |  | 1.7 | 4.9 | $5 \times 10^{10}$ | 139 |
| Example 24 |  |  | 1.7 | 14.5 | $4 \times 10^{10}$ | 141 |
| Example 25 |  |  | 1.7 | 19.1 | $4 \times 10^{10}$ | 124 |
| Example 26 |  | $Eu_2O_3$ | 1.9 | 0.1 | $9 \times 10^{13}$ | 120 |
| Example 27 |  |  | 1.8 | 0.5 | $7 \times 10^{12}$ | 124 |
| Example 28 |  |  | 1.8 | 4.9 | $3 \times 10^{13}$ | 131 |
| Example 29 |  |  | 1.8 | 14.5 | $1 \times 10^{13}$ | 135 |
| Example 30 |  |  | 1.8 | 19.3 | $1 \times 10^{12}$ | 121 |
| Example 31 |  | $Ho_2O_3$ | 1.8 | 0.1 | $8 \times 10^{12}$ | 119 |
| Example 32 |  |  | 1.8 | 0.5 | $5 \times 10^{12}$ | 125 |
| Example 33 |  |  | 1.8 | 4.8 | $2 \times 10^{12}$ | 139 |
| Example 34 |  |  | 1.7 | 14.5 | $1 \times 10^{11}$ | 141 |
| Example 35 |  |  | 1.7 | 19.1 | $1 \times 10^{11}$ | 123 |
| Example 36 |  | $La_2O_3$ | 1.9 | 0.1 | $6 \times 10^{13}$ | 128 |
| Example 37 |  |  | 1.9 | 0.5 | $2 \times 10^{12}$ | 130 |
| Example 38 |  |  | 1.8 | 4.9 | $9 \times 10^{12}$ | 133 |
| Example 39 |  |  | 1.8 | 14.5 | $5 \times 10^{12}$ | 137 |
| Example 40 |  |  | 1.7 | 19.2 | $2 \times 10^{11}$ | 129 |

Note
A: Yttrium compound;
B: Lanthanide compound;
C: Yttrium aluminum oxide amount (wt %);
D: Lanthanoid amount (atom %);
E: Volume resistivity at room temperature (Ωcm)
F: Thermal conductivity (W/Mmk)
1) Extremes of amount of yttrium aluminum oxide for aluminum nitride
2) Extremes of amount of lanthanoid element for yttrium element

TABLE 3

|  | A | B | $C_{1)}$ | $D_{2)}$ | E | F |
|---|---|---|---|---|---|---|
| Example 1 | YAG | $Nd_2O_3$ | 0.4 | 4.9 | $3 \times 10^{14}$ | 114 |
| Example 2 | $Y_2O_3$ | $Nd_2O_3$ | 0.4 | 4.9 | $6 \times 10^{14}$ | 121 |
| Example 3 | YAG | $Nd_2O_3$ | 11.4 | 4.8 | $4 \times 10^{10}$ | 91 |
| Example 4 | $Y_2O_3$ | $Nd_2O_3$ | 11.2 | 4.9 | $8 \times 10^{10}$ | 96 |
| Example 5 | YAG | $Nd_2O_3$ | 1.9 | 0.08 | $4 \times 10^{14}$ | 114 |
| Example 6 | $Y_2O_3$ | $Nd_2O_3$ | 1.9 | 0.09 | $7 \times 10^{14}$ | 121 |
| Example 7 | YAG | $Nd_2O_3$ | 1.7 | 21.5 | $2 \times 10^{10}$ | 93 |
| Example 8 | $Y_2O_3$ | $Nd_2O_3$ | 1.7 | 20.9 | $4 \times 10^{10}$ | 97 |
| Example 9 | YAG | — | 1.9 | — | $7 \times 10^{14}$ | 124 |
| Example 10 | $Y_2O_3$ | — | 1.9 | — | $2 \times 10^{16}$ | 128 |

Note
A: Yttrium compound;
B: Lanthanide compound;
C: Yttrium aluminum oxide amount (wt %);
D: Lanthanoid amount (atom %);
E: Volume resistivity at room temperature (Ωcm)
F: Thermal conductivity (W/Mk)
1) Extremes of amount of yttrium aluminum oxide for aluminum nitride
2) Extremes of amount of lanthanoid element for yttrium element As is seen from Tables 1 to 3, it is recognized that the aluminum nitride sintered bodies (Examples) containing lanthanoid element 0.1 to 20 atom % in extremes for yttrium element exhibit the low volume resistivity ($10^{14}$ Ω·cm or less) in comparison with those (Comparative Examples 9 and 10) not containing the lanthanoid element or those (Comparative Examples 5 and 6) containing less than 0.1 atom % the lanthanoid element in extremes for the yttrium element.

The aluminum nitride sintered bodies (Comparative Examples 1 and 2) containing less than 0.5 wt % the yttrium aluminum oxide phase in extremes for the aluminum nitride phase, exhibit the high volume resistivity ($10^{14}$ Ω·cm or more), not providing the lowering effect of the volume resistivity.

The Examples do not show the lowering of the thermal conductivity of the aluminum nitride sintered body due to containing of the lanthanoid element, and show values equivalent to or more than those (Comparative Examples 9 and 10) not containing the lanthanide element.

On the other hand, in the aluminum nitride sintered bodies (Comparative Examples 7 and 8) containing the lanthanide element exceedingly 20 atom % in extremes for the yttrium element, the thermal conductivity goes down less than 100 W/mK.

Further, also in the aluminum nitride sintered bodies (Comparative Examples 3 and 4) containing the yttrium aluminum oxide phase exceedingly 10 wt % in extremes for the aluminum nitride phase, the thermal conductivity goes down less than 100 W/mK.

In each of the Examples, the explanation has been made to the case where the yttrium compound powder and the lanthanide compound powder are in advance heat-treated and then the aluminum nitride powder is mixed therewith, not limiting to this case, but the same effect is available in a simultaneous mixture of the aluminum nitride powder, yttrium compound powder and lanthanoid compound powder.

Besides, both of the yttrium compound and the lanthanide compound are not limited to oxide, and the lanthanide element may be mixed with not only one kind but also several kinds.

As shown in FIG. 1, an electrostatic chuck was composed by interposing an electrode 3 of single pole type between a substrate 1 of the aluminum nitride sintered body of the Comparative Example 10 and a dielectric layer 2 of 0.3 mm thickness comprising the aluminum nitride sintered body of the Example 23. When voltage of 1 kV was impressed at temperature of −30° C. from a source E to a terminal 4 connecting the electrode 3 and a silicon wafer W on the dielectric layer 2, holding force of static electricity was 300 g/cm², and it took time within 1 second from stopping impression of voltage to enabling to leave the silicon wafer W.

For comparison, the electrostatic chuck was composed in the same manner other than the die lec tric layer of 0.3 mm thickness comprising the aluminum nitride sintered body of the Comparative Example 10, and when the same voltage was impressed at the same temperature, the holding force of static electricity was 2 g/cm², and it took time of 1 minute or more from stopping impression of voltage to enabling to leave the silicon wafer.

Thus, it is seen that in case of applying the inventive aluminum nitride sintered body to the electrostatic chuck, the holding thereof is far improved, and the remaining holding force at stopping impression of voltage is far lowered.

The electrode of the electrostatic chuck is not limited to the single pole type, and of course a dipole type is sufficient.

Figure 2:
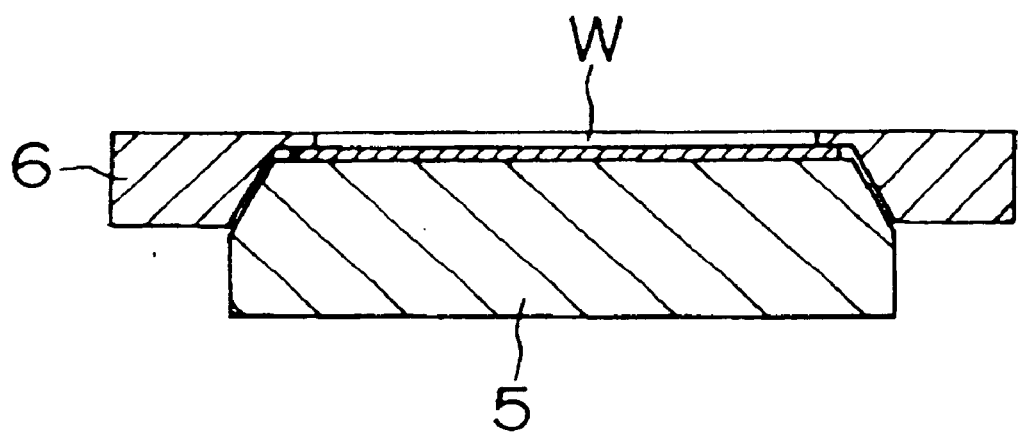
FIG. 2 is a cross sectional view showing one example of practiced embodiments of the susceptor and the clamp ring.

As shown in FIG. 2, the susceptor 5 and the clamp ring 6 were formed with the aluminum nitride sintered body of the Example 22, and the silicon wafer W was mounted on the susceptor at room temperature. The wafer was pressed down at circumference by the clamp ring 6 to hold the silicon wafer W, but the silicon wafer W did not disorder.

For comparison, the susceptor and the clamp ring were formed with the aluminum nitride sintered body of the Comparative Example 10, and the silicon wafer was mounted on the susceptor at room temperature. When the wafer was pressed down at circumference by the clamp ring to hold the silicon wafer, the silicon wafer disordered.

It is therefore seen that in case of applying the inventive aluminum nitride sintered body to the susceptor and the clamp ring, the static electricity can be escaped, and the silicon wafer may be prevented from disorder and held silent.

Further, the dummy wafer was formed with the aluminum nitride sintered body of the Example 22, and when it was held by the electrostatic chuck at room temperature, the holding was possible.

For comparison, the dummy wafer was formed with the aluminum nitride sintered body of the Comparative Example 10, and when it was held by the electrostatic chuck at room temperature, the holding was impossible.

It is accordingly seen that in case of applying the inventive aluminum nitride sintered body to the dummy wafer, the holding by the electrostatic chuck is possible.

Furthermore, as the particle catcher has the same structure as that of the electrostatic chuck, explanation will be made, omitting a drawing. Similarly to the electrostatic chuck, a particle catcher was composed by interposing the electrode of single pole type between a substrate of the aluminum nitride sintered body of the Comparative Example 10 and a dielectric layer of 0.3 mm thickness comprising the aluminum nitride sintered body of the Example 23. When voltage of lkV was impressed from the source E to catch particles, the capture force was improved and particles were left favorably when stopping impression of voltage.

For comparison, the particle catcher was composed in the same manner other than the dielectric layer of 0.3 mm thickness comprising the aluminum nitride sintered body of the Comparative Example 10, and when the same voltage was impressed at the same temperature to catch particles, the capture force of particles was low, and particles were left unfavorably when stopping impression of voltage.

Thus, it is seen that in case of applying the inventive aluminum nitride sintered body to the particle catcher, the capture force of particles is improved, and particles are left favorably when stopping impression of voltage.

The electrode of the particle catcher is not limited to the single pole type, and of course a dipole type is sufficient.

As explained above, according to the aluminum nitride sintered body and the production method of the invention, as heterogeneous elements are not introduced into the aluminum nitride crystal, the high thermal conductivity of 100 W/mK or more may be maintained, and the volume resistivity at room temperature of the aluminum nitride sintered body may be lowered below $10^{14}$ Ω·cm by the lowering of restraining force of the electric charge carrier caused by strain introduced in crystal lattice of the yttrium aluminum oxide phase existing at grain boundaries of the aluminum nitride phase.

Besides, according to the electrostatic chuck, susceptor, dummy wafer, clamp ring and particle catcher employing the aluminum nitride sintered body having the high thermal conductivity of 100 W/mK or more and the volume resistivity at room temperature of below $10^{14}$ Ω·cm, rapid increasing and decreasing of temperatures are possible, and the throughput of wafer treatment may be improved. In the electrostatic chuck, improvement of holding force and reduction of the remaining holding force may be effected, and temperature at the in-plane of the wafer may be kept uniform. In the susceptor and the clamp ring, static electricity can be escaped and the wafer can be held silent, and temperature at the in-plane of the wafer may be kept uniform. In the dummy wafer, the holding by the electrostatic chuck is possible. In the particle catcher, the capture force of particles is heightened, and the leaving of particles can be made well when stopping impression of voltage.

What is claimed is:

1. An aluminum nitride sintered body comprising an aluminum nitride phase and an yttrium aluminum oxide phase formed at grain boundaries of an aluminum nitride phase, wherein the yttrium aluminum oxide phase is 0.5 to 10 wt % based on the aluminum nitride phase, and contains at least one of a lanthanide element in an amount of 0.1 to 20 atom % based on the yttrium element.

2. An aluminum nitride sintered body according to claim 1, wherein the yttrium aluminum oxide phase is 0.7 to 5 wt % based on the aluminum nitride phase.

3. An aluminum nitride sintered body according to claim 1, wherein the yttrium aluminum oxide phase is 0.7 to 3 wt % based on the aluminum nitride phase.

4. An aluminum nitride sintered body according to claim 1, wherein the yttrium aluminum oxide phase contains at least one of a lanthanide element in an amount of 0.1 to 15 atom % based on the yttrium element.

5. An aluminum nitride sintered body according to claim 1, wherein the yttrium aluminum oxide phase contains at least one of a lanthanide element in an amount of 0.5 to 10 atom % based on the yttrium element.

6. An aluminum nitride sintered body according to claim 1, wherein said lanthanide element is anyone selected from Ho, La, Nd, and Eu.

7. An aluminum nitride sintered body according to claim 1, wherein an amount of impurity Si contained in said aluminum nitride sintered body is smaller than 1 wt %.

8. A method of producing an aluminum nitride sintered body according to claim 1, comprising the steps of:

forming mixed powders by mixing an aluminum nitride powder with an yttrium compound powder and at least one lanthanide compound powder and dewaxing them; and sintering the dewaxed body at temperature between 1600 and 2000° C. in a non oxidizing atmosphere, thereby to produce the aluminum nitride sintered body.

9. The method of producing aluminum nitride sintered body according to claim 8, wherein said mixed powders forming step comprises a step of mixing so that the aluminum nitride powder is added with the yttrium compound powder in such a manner that, in the mixed powder, the yttrium aluminum oxide phase to be generated by sintering is 0.5 to 10 wt % based on the aluminum nitride phase, and contains at least one lanthanide element 0.1 to 20 atom % based on the yttrium element.

10. The method of producing aluminum nitride sintered body according to claim 8, wherein said the yttrium compound powder comprises any one of an yttrium oxide and an yttrium aluminum oxide.

11. The method of producing aluminum nitride sintered body according to claim 8, wherein said the yttrium compound powder comprises YAG powder.

12. The method of producing aluminum nitride sintered body according to claim 8, wherein said lanthanide element is anyone selected from Ho, La, Nd, and Eu.

13. The method of producing aluminum nitride sintered body according to claim 8, wherein said sintering step comprises a step of sintering the dewaxed body at temperature between 1750 and 1900° C.

14. The method of producing aluminum nitride sintered body according to claim 8, wherein said forming mixed powders comprises a step of premixing an yttrium compound powder and one lanthanide compound powder and a step of heating the premixed powders at temperature between 1400 and 1800° C., and mixing the heated premixed powders with aluminum nitride powder.

15. An electrostatic chuck, wherein the aluminum nitride sintered body according to claim 1 is employed.

16. A susceptor, wherein the aluminum nitride sintered body according to claim 1 is employed.

17. A dummy wafer, wherein the aluminum nitride sintered body according to claim 1 is employed.

18. A clamp ring, wherein the aluminum nitride sintered body according to claim 1 is employed.

19. A particle catcher, wherein the aluminum nitride sintered body according to claim 1 is employed.

20. An aluminum nitride sintered body according to claim 1, wherein said aluminum nitride sintered body has a thermal conductivity greater than or equal to 100 W/mK and a volume resistivity at room temperature of $10^{14}$Ω·cm or less.

* * * * *